(12) United States Patent
Iida

(10) Patent No.: US 6,424,605 B1
(45) Date of Patent: Jul. 23, 2002

(54) OPTICAL DISC DRIVE

(75) Inventor: Michihiko Iida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/028,228

(22) Filed: Feb. 23, 1998

(30) Foreign Application Priority Data

Feb. 26, 1997 (JP) ............................................. 9-042518

(51) Int. Cl.$^7$ ................................................ G11B 7/00
(52) U.S. Cl. ................................ 369/44.27; 309/44.29; 309/53.23
(58) Field of Search ............................. 369/58, 94, 54, 369/44.37, 44.23, 112, 44.27, 44.35, 44.29, 53.23

(56) References Cited

U.S. PATENT DOCUMENTS

| | | | | |
|---|---|---|---|---|
| 5,665,957 A | * | 9/1997 | Lee et al. | 369/118 |
| 5,684,773 A | * | 11/1997 | Hayashi | 369/58 |
| 5,757,745 A | * | 5/1998 | Takeya | 369/44.27 |
| 5,781,519 A | * | 7/1998 | Ishika et al. | 369/58 |
| 5,831,952 A | * | 11/1998 | Yamada et al. | 369/94 |
| 5,903,531 A | * | 5/1999 | Satoh et al. | 369/58 |
| 5,966,355 A | * | 10/1999 | Kamiyama | 369/44.27 |
| 6,011,762 A | * | 1/2000 | Watanabe et al. | 369/44.27 |

FOREIGN PATENT DOCUMENTS

| | | |
|---|---|---|
| EP | 0470807 A1 | 2/1992 |
| EP | 0742552 A2 | 11/1996 |
| EP | 0745982 A2 | 12/1996 |
| EP | 0790604 A2 | 8/1997 |
| EP | 0810588 A2 | 12/1997 |

\* cited by examiner

*Primary Examiner*—Thang V. Tran
(74) *Attorney, Agent, or Firm*—Oblon, Spivak, McClelland, Maier & Neustadt, P.C.

(57) ABSTRACT

An optical disc drive is provided which is compatible with a plurality of types of optical discs different in track pitch from each other to write and/or read data onto and/or from a loaded one of such optical discs. It comprises a first pickup provided for a first optical disc having a first track pitch; a second pickup provided for a second optical disc having a second track pitch smaller than the first one; a focus servo circuit to control a focus servo of the first and second pickups and pull in the focus servo, based on a focus error signal; a tracking servo circuit to control tracking of the first and second pickups based on a tracking error signal; and a control circuit to start pulling in the focus servo using the first pickup with respect to an optical disc loaded, detect, based on the focus error signal resulting from the focus servo pull-in operation, that the first pickup is in a nearly perfect focus, move the first pickup radially relative to the disc when the first pickup is in a nearly perfect focus, and judge the loaded optical disc as the first one when a tracking error signal is detected during the radial move of the first pickup, or as the second one when no tracking error signal is detected during the radial move of the first pickup.

39 Claims, 12 Drawing Sheets

CD

CO-R

DVD

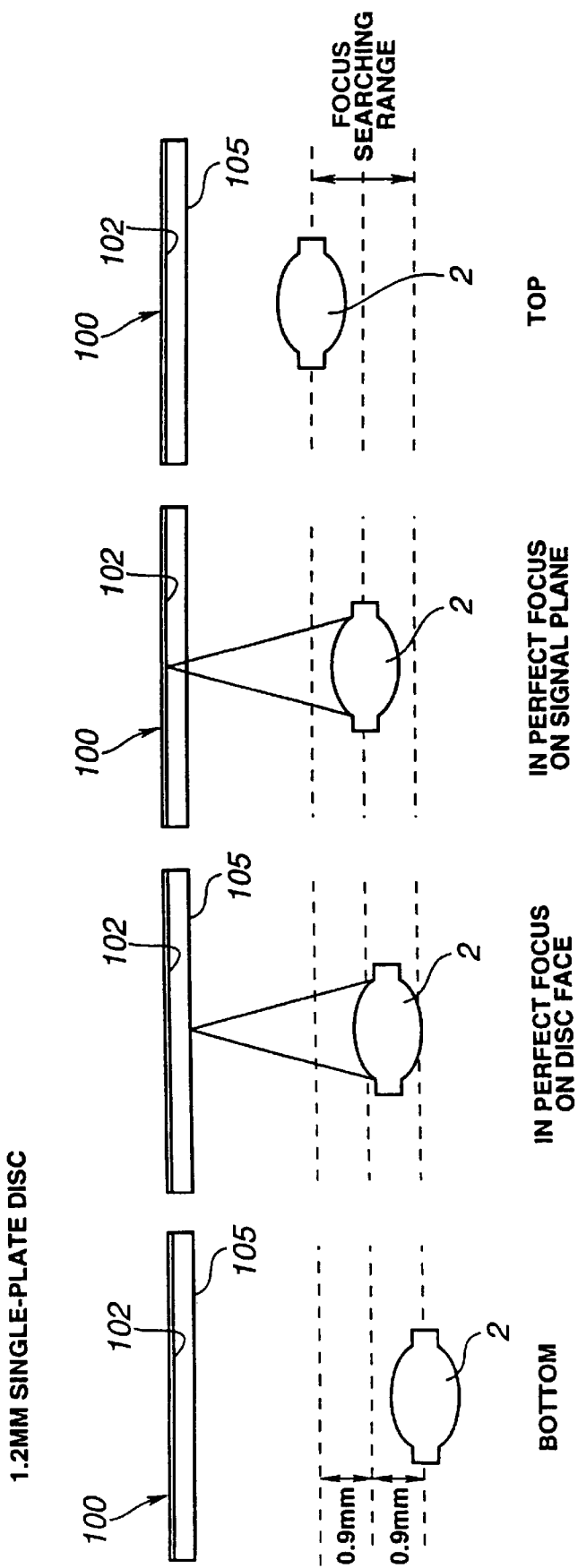

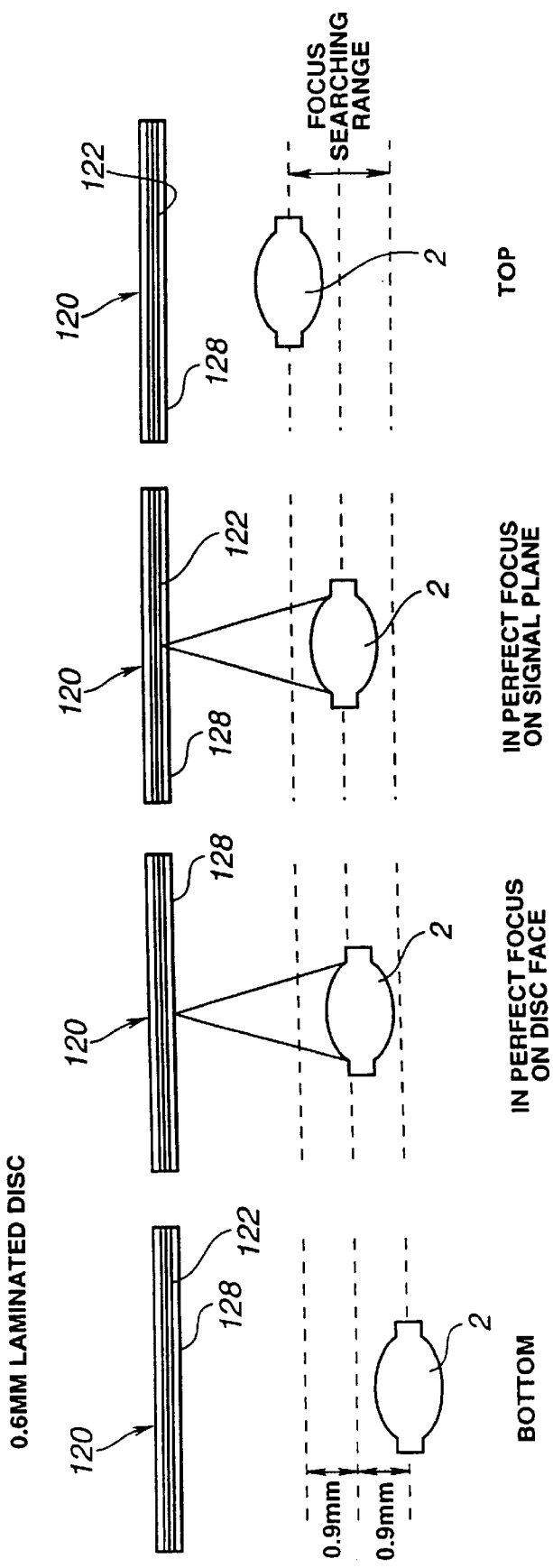

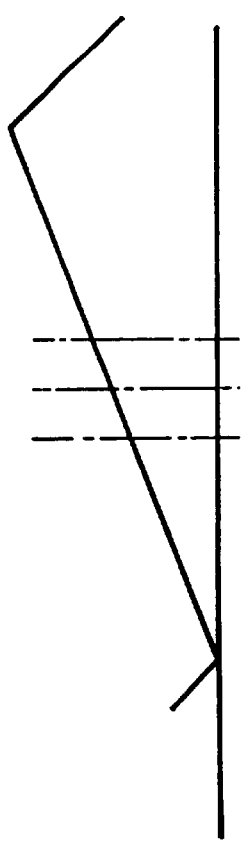
FIG.8A FOCUS SEARCH DRIVE WAVEFORM
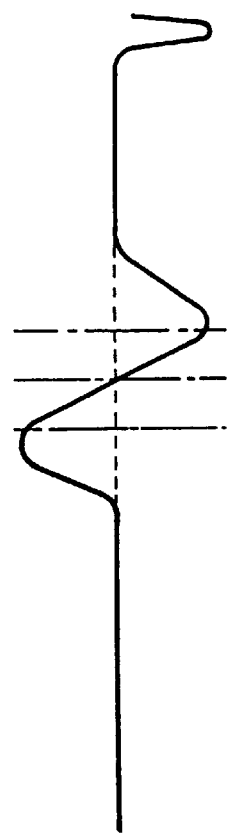
FIG.8B FOCUS ERROR SIGNAL FE
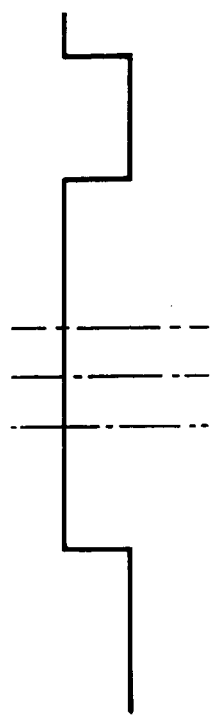
FIG.8C FOCUS OK SIGNAL
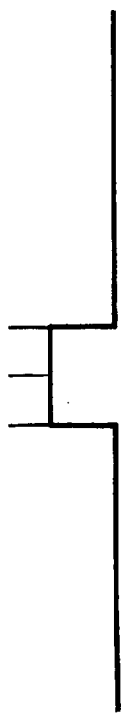
FIG.8D FOCUS SERVO LOOP ON TIMING

OPTICAL DISC DRIVE

BACKGROUND OF THE INVENTION

1. Field of the Invention

The present invention relates to an optical disc drive Compatible With a Plurality of Types of Optical Discs compatible with a plurality of types of optical discs of different track pitches to write and/or read data into and/or from a loaded one of such optical discs.

2. Description of Related Art

Compact discs (CD) as optical storage media are widely prevailing. The CD-type optical discs are used in various fields including musical applications. The compact discs for the musical applications are usually of the read-only type. Further, write-once type compact discs called CD-R have also been developed.

Further, optical discs called digital versatile disc/digital video disc have also been developed which are suitable for multimedia applications. They are proposed for many purposes such as storage of video data, audio data and computer data. Owing to the reduction of recording track pitch and data compression technology, the DVD has a remarkably increased capacity of recording though its size is the same as that of the CD (12 cm in diameter).

Optical discs of new different types have been and will possibly be developed more and more. In these situations, it is desired to provide an optical disc drive compatible with such newly developed types of CDs as well as conventional optical discs.

As far as the above-mentioned DVD is concerned, it is desired to develop an optical disc drive compatible with CD as well. To accommodate the differences in layer structure and other factors between CD and DVD, however, the optical disc drive for both CD and DVD should incorporate two pickups (or some elements of an optical system used in the pickup), one for CD and the other for DVD. Therefore, the dedicated pickups should be selectively used depending upon whichever is loaded in the optical drive, a CD or DVD.

In an optical disc drive in which such certain elements thereof are selectively used for the optical drive to be compatible with a plurality of different types of optical discs, it is necessary to accurately discriminate the type of an optical disc loaded in the optical drive.

In the case of a cartridge disc, namely, an optical disc housed in a cartridge, the type of an optical disc loaded in the optical disc drive can easily be judged by means of an ID hole or the like provided on the cartridge. However, a mechanical discriminating means like the ID hole cannot be adopted for discrimination of optical discs not encased in a cartridge and having a same size, like the above-mentioned CD and DVD.

Furthermore, use of sensors, and special parts intended for discrimination of the disc type is not desirable since they would add to the structural complexity and costs of manufacture of the optical drive products.

SUMMARY OF THE PRESENT INVENTION

To meet the above-mentioned needs, the present invention has an object to provide an optical disc drive compatible with both an optical disc having a large track pitch and one of which the track pitch is small and adapted to accurately and simply discriminate the type of a loaded one of such optical discs.

The above object can be accomplished by providing an optical disc drive compatible with a plurality of types of optical discs of different track pitches to write and a read data into and/or from a loaded one of such optical discs, comprising a first pickup provided for a first optical disc having a first track pitch, a second pickup provided for a second optical disc having a second track pitch smaller than the first one, a focus servo circuit to control a focus servo of the first and second pickups and pull in the focus servo, based on a focus error signal, a tracking servo circuit to control tracking of the first and second pickups based on a tracking error signal and a control circuit to start pulling in the focus servo using the first pickup with respect to an optical disc loaded, detect, based on the focus error signal resulting from the focus servo pull-in operation such, that the first pickup is in a nearly perfect focus, move the first pickup radially relative to the disc when the first pickup is in the nearly perfect focus, and judge the loaded optical disc as the first one when a tracking error signal is detected during the radial move of the first pickup, or as the second one when no tracking error signal is detected during the radial move of the first pickup.

Furthermore, the above object can also be accomplished by providing an optical disc drive compatible with a plurality of types of optical discs having different recording densities to write and/or read data into and/or from a loaded one of such optical discs, comprising pickup means provided with a first light source to provide a laser beam of a first wavelength, and a second light source to provide a laser beam of a second wavelength shorter than the first one, and which radiates a laser beam from the first or second light source to an optical disc loaded in the optical disc drive, a servo processor for controlling focus and tracking servos of the pickup means based on an error signal and tracking signal and means for discriminating the type of a loaded optical disc based on the level of a tracking error signal included in a return component of the laser beam irradiated to the optical disc.

Further more, the above object can also be accomplished by providing a method of discriminating a plurality of optical discs of different track pitches, comprising the steps of moving an optical disc loaded in an optical disc drive in a direction toward and away from an objective lens, radiating a laser beam from a light source to a signal plane of the optical disc through the objective lens being moved, detecting a tracking error signal contained in the reflected beam from the signal plane and discriminating the type of the loaded optical disc based on the level of the detected tracking error signal.

The optical disc drive according to the present invention can discriminate, without actuation of the focus servo, an optical disc having a large track pitch from one having a small track pitch based on a tracking error signal detected when the pickup is present in the vicinity of the in-focus point. Thus, the optical disc drive according to the present invention can discriminate optical disc types one from another using no sensors, and special parts and others intended for detecting the type of an optical disc loaded in the drive.

Also, the optical disc drive according to the present invention can achieve a high speed of disc discrimination since only one pickup is used for the disc discrimination.

Furthermore, the optical disc drive according to the present invention can read and write, in a reduced time, data into and from a large track-pitch optical disc loaded in the drive since the CD focus loop can be pulled in while the disc type is being discriminated.

BRIEF DESCRIPTION OF THE DRAWINGS

These objects and other objects, features, aspects and advantages of the present invention will become more apparent from the following detailed description of the optical disc drive compatible with both CD and DVD according to the present invention when taken in conjunction with the accompanying drawings in which:

FIGS. 6A–6D are explanatory drawing showing the relation between an optical disc and objective lens during focus servo control;

FIGS. 7A–7D are explanatory drawing showing the relation between the disc and objective lens during focus servo control;

FIGS. 8A–8D show waveforms of focus error signal and other signals for explanation of the operation of pulling in a focus servo loop;

DETAILED DESCRIPTION OF THE PREFERRED EMBODIMENTS

Figure 1A:
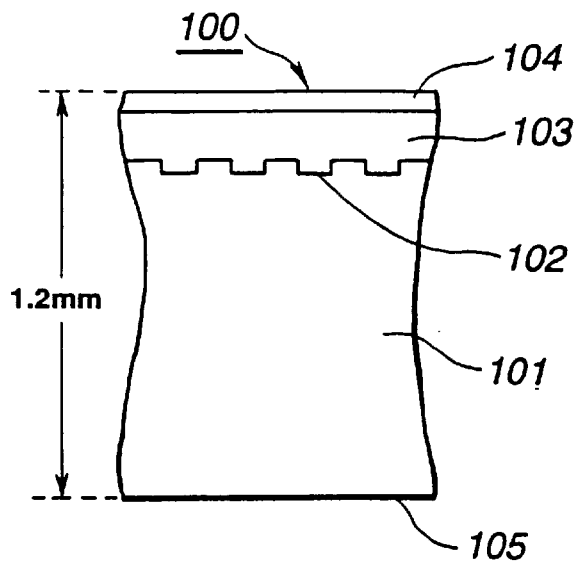
FIGS. 1A–1C are an explanatory drawing showing the structures of optical discs with which the optical disc drive embodied of the present invention is compatible.
Figure 1B:
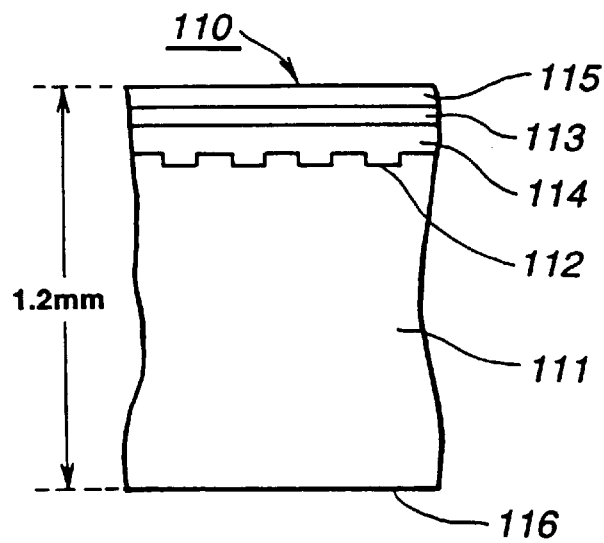
Figure 1C:
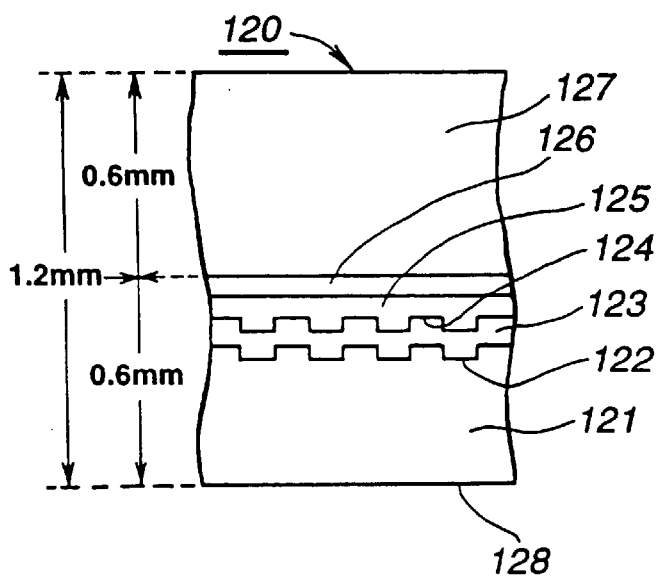

Referring now to FIGS. 1A–1C, the structures of a CD, DVD and CD-R will be discussed first herebelow prior to proceeding to the description of the optical disc drive compatible with both CD and DVD according to the present invention. Note here that the CD, DVD and CD-R are all of 12 cm in diameter as shown.

FIGS. 1A, 1B and 1C are sectional views, showing the layer structures of CD, CD-R and DVD, respectively, each of 1.2 mm in entire disc thickness.

In FIG. 1A, the CD is generally indicated with a reference numeral 100. The CD 100 comprises a disc substrate (transparent layer) 101 made of a transparent synthetic resin having a high optical transmittance and a mechanical or chemical resistance, such as transparent polycarbonate, polyvinyl chloride, acrylic resin or the like. The disc substrate 101 has a signal plane 102 formed by pits transferred to one of the major sides of the substrate 101 by a stamper built in a molding die. Being small encoded depressions of different circumferential lengths correspondingly to given information signals, the pits thus formed in the signal plane 102 define together a recording track. The recording track is 1.6 μm wide.

Over the surface of the disc substrate 101 having the signal plane 102 there is deposited aluminum or the like having a high reflectivity to form a reflective layer 103. Further, a protective layer 104 is provided on the reflective layer 103. These layer elements and disc substrate form together the CD 100.

For data reading, a laser beam emitted from the optical disc drive will be incident from a disc face 105 upon the signal plane 102, and information recorded in the signal plane 102 will be detected from a return beam from the disc.

The CD-R 110 shown in FIG. 1B is a recordable media. It has the same physical properties (diameter, weight and thickness) and storage capacity as the CD 100. The CD-R 110 is rather suitable for more economical small production and has a longer service life than the CD 100. Therefore, the CD-R 110 is more suitable for data preservation purposes.

As in the CD 100, the CD-R 110 comprises a transparent disc substrate 111 (made of polycarbonate) located next to a disc face 116.

The CD-R 110 further comprises an organic dye layer 114, reflective gold layer 113 and protective layer 115 formed as laminated in this order on the disc substrate 111. Also, the disc substrate 111 has formed thereon grooves serving to guide the irradiation of a laser beam. The grooves are covered with the organic dye layer 114. When a laser beam is incident upon the optical disc, a reaction will take place between the organic dye layer 114 and polycarbonate-made disc substrate 111 under the effect of the laser beam heat to form pits corresponding to given information signals. The pits thus formed define together a signal plane 112 carrying actual data.

Similarly, the DVD 120 comprises a disc substrate 121 located next to a disc face 128, and a signal plane on a side of the disc substrate 121 opposite to the disc face 128 as shown in FIG. 1C. The DVDs having so far been proposed include two types: a single-layer disc having a single signal plane, and a double-layer disc having two signal planes, the latter being shown in FIG. 1C. The two signal planes are a first signal plane. 122 and second signal plane 124. The first signal plane 122 and a first reflective layer 123 associated with the plane 122 define together a first data recording layer, while the second signal plane 124 and a second reflective layer 125 associated with the plane 124 define together a second data recording layer.

The DVD further comprises an adhesive bond (layer) 126 provided on the second reflective layer 125 and by which a dummy substrate 127 is bonded to the second reflective layer 125.

The first reflective layer 123 is translucent to reflect a predetermined proportion of the incident laser beam. Thus, when the laser beam is focused on the first signal plane 122, signals recorded in the first signal plane 122 can be read from light reflected off the first reflective layer 123. When the laser beam is focused on the second signal plane 124, it is passed through the first reflective layer 123 and collected onto the second signal plane 124. Signals recorded in the second signal plane 124 can thus be read from the return beam from the second reflective layer 125.

In a single-layer disc, a signal plane and reflective layer are formed like the second signal plane 124 and second reflective layer 125.

It should be noted that in the following description of the embodiments of the present invention, the first signal plane 122, second signal plane 124 and a signal plane of a single-layer disc will be simply referred to as "signal plane" and as "signal plane 122" in the drawings with reference to which the present invention will be described herein, commonly to both the single-layer disc and double-layer disc.

As apparent from FIGS. 1A and 1B, each of the signal planes 102 and 112 of the CD 100 and CD-R 110, respectively, is located near the extremity of the disc thickness in a view from each of the disc faces 105 and 116 (namely, the signal planes 102 and 112 on which the laser spot is to be focused are located at a position of about 1.2 mm from the disc faces 105 and 116, respectively).

On the other hand, the signal plane 122 (124) in the DVD 120 is located near the middle of the disc thickness in a view from the disc face 128 (namely, the signal plane 122 (124) on which the laser spot is to be focused is located at a position of about 0.6 mm from the disc face 128).

The pitch of the track formed in the signal plane 122 (124) of the DVD 120 is 0.74 μm, is as narrow as approximately one half of that (1.6 μm) of the CD 100 and CD-R 110. Also, the density of recording by the pits formed in the signal plane 122 (124) is as high as compared to that in the CD 100 and CD-R 110.

Because of the above differences, a DVD drive will use a pickup using a reading laser of 650 nm or less in wavelength and an objective lens having a NA (numerical aperture) of 0.6, and optimally designed to focus a laser spot at a position about 0.6 mm from the disc face 128. Namely, the pickup for the DVD should preferably be different from those for the ordinary CDs.

With an optical disc drive compatible with both CD and DVD, adopting the above-mentioned pickup design, it is not impossible to read information from the signal plane 102 of the CD 100 with a laser beam having a wavelength of 650 nm or less. Also, it is possible to focus a laser spot at a position of about 1.2 mm from the disc face 105 of the CD 100.

Actually, however, it would be better to employ in the CD/DVD-compatible optical disc drive, if possible, a pickup device optimized in various characteristics thereof for the CD 100 as well, which will be advantageously effective for data reading, too.

Further, the CD-R 110 will be discussed further herebelow. The CD-R 110 has the organic dye layer 114 which has a dependency upon wavelength. So, data cannot accurately be read from the CD-R 110 using a laser beam of 650 nm or less.

In the CD-R 110, its organic dye layer 114 will absorb an increased quantity of incident laser beam of 650 nm or less in wavelength illuminated to the disc but reflect it with a reduced coefficient, and the laser beam is less modulated by the pits in the signal plane. Also, when recording data into the CD-R 110, pits will be formed for a suitable absorptivity and reflectivity for a laser of 780 nm in wavelength. Thus, a sufficient modulation cannot be achieved when it is tried to read data recorded with such pits using a laser having any other wavelength than 780 nm.

As known from the foregoing, it will be well understood that in an optical disc drive compatible with both CD 100 (CD-R 110) and DVD 120, at least the objective lens and laser source should preferably be dedicated for each of the optical discs to be used with the optical disc drive.

Referring now to FIGS. 2 through 5, a description will be made herebelow of an example, only illustrative and not limiting, of the construction of an optical disc drive compatible with both CD 100 (CD-R 110) and DVD 120, according to the present invention. The optical disc drive comprises a pickup for the CD 100 and CD-R 110, and one for the DVD 120. Note that the CD 100, CD-R 110 and DVD 120 will collectively be referred to simply as "disc D" in the following description.

Figure 2:
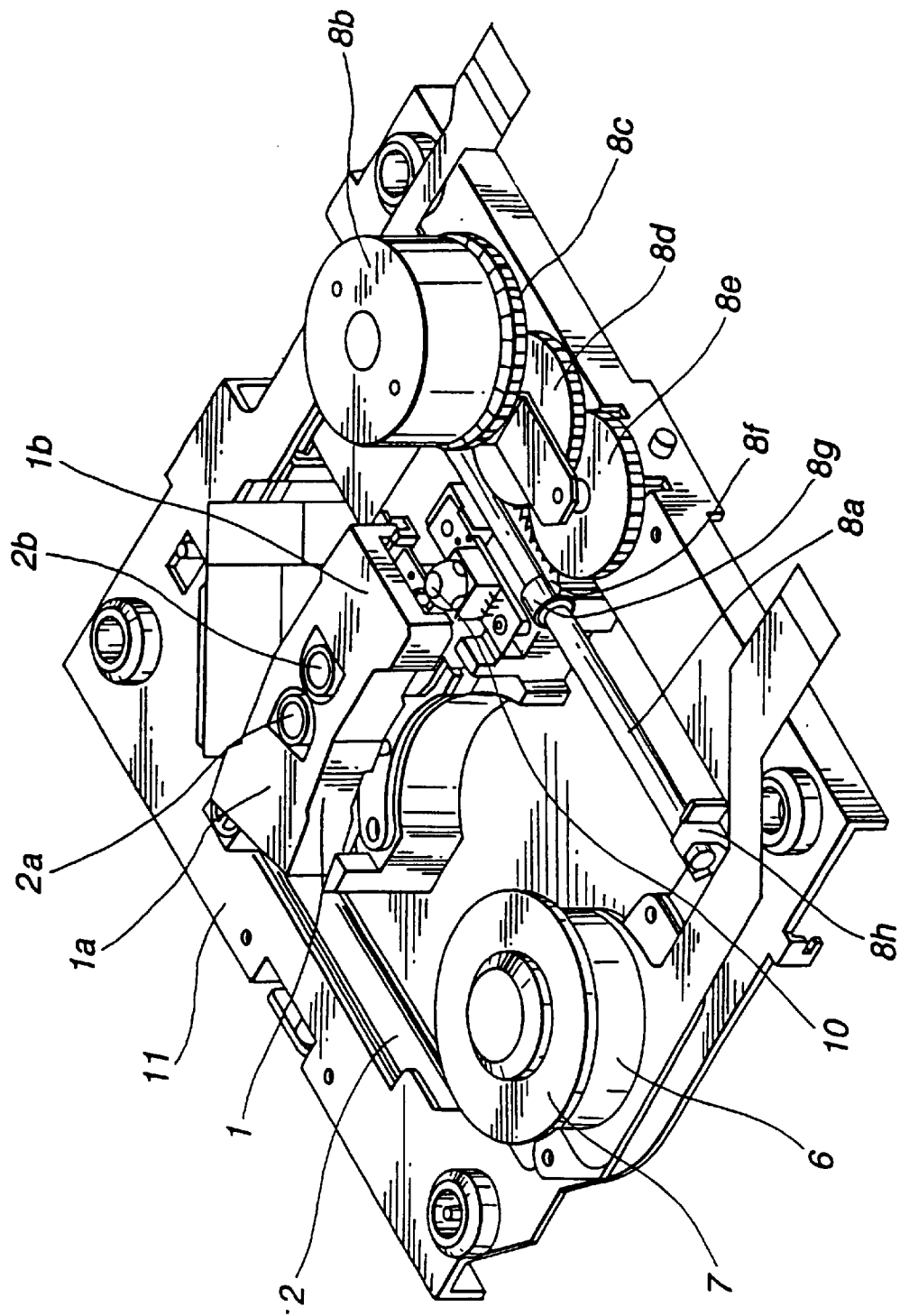
FIG. 2 is a perspective view of a mechanical deck of the optical disc drive of the present invention.

FIG. 2 is a perspective view of a readback or playback drive (so-called mechanical deck) in an optical disc drive.

The mechanical deck is provided on a sub chassis 11 thereof with various mechanisms necessary for driving and reading the disc. A disc D loaded into the optical disc drive will be placed on a turntable 7 which will be driven by a spindle motor 6 to spin the disc D.

The optical disc drive has, within an enclosure, a pickup unit 1 comprising a CD pickup 1a comprising an optical system and laser source optimized for the CD 100 (CD-R 110) and a DVD pickup 1b comprising an optical system and laser source optimized for the DVD 120. The CD and DVD pickups 1a and 1b are independent of each other. The CD pickup 1a adopts a CD objective lens 2a to provide a laser output. The laser output terminal of the DVD pickup 1b is a DVD objective lens 2b.

The pickup unit 1 is adapted to be slidable by a so-called sled mechanism 8 in the direction of the disc radius. For this sliding, a main shaft 8a and sub shaft 12 are provided on either end of the pickup unit 1 as shown. The pickup unit 1 has a holder 8g provided at one end thereof and another holder (not shown) at the opposite end. The main shaft 8a extends through the holder 8g while the sub shaft 12 extends through the other holder (not shown). Thus, the pickup unit 1 is supported by the main and sub shafts 8a and 12 for sliding on and along the shafts.

A sled motor 8b, and sled transmission gears 8c, 8d and 8e are provided to allow the pickup unit 1 to slide on the main and sub shafts 8g and 12. Also, a rack gear 8f is installed near the holder 8g of the pickup unit 1.

When the sled motor 8b is put into rotation, its rotation is transmitted to the sled transmission gears 8c, 8d and 8e. The sled transmission gear 8e is in mesh with the rack gear 8f, so that the transmitted rotation of the sled motor 8b will slide the pickup unit 1 on the main and sub shafts 8g and 12. Therefore, as the sled motor 8b is driven in the forward or reverse direction, the pickup unit 1 in a direction toward or away from a disc D on the turntable 7.

Figure 3:
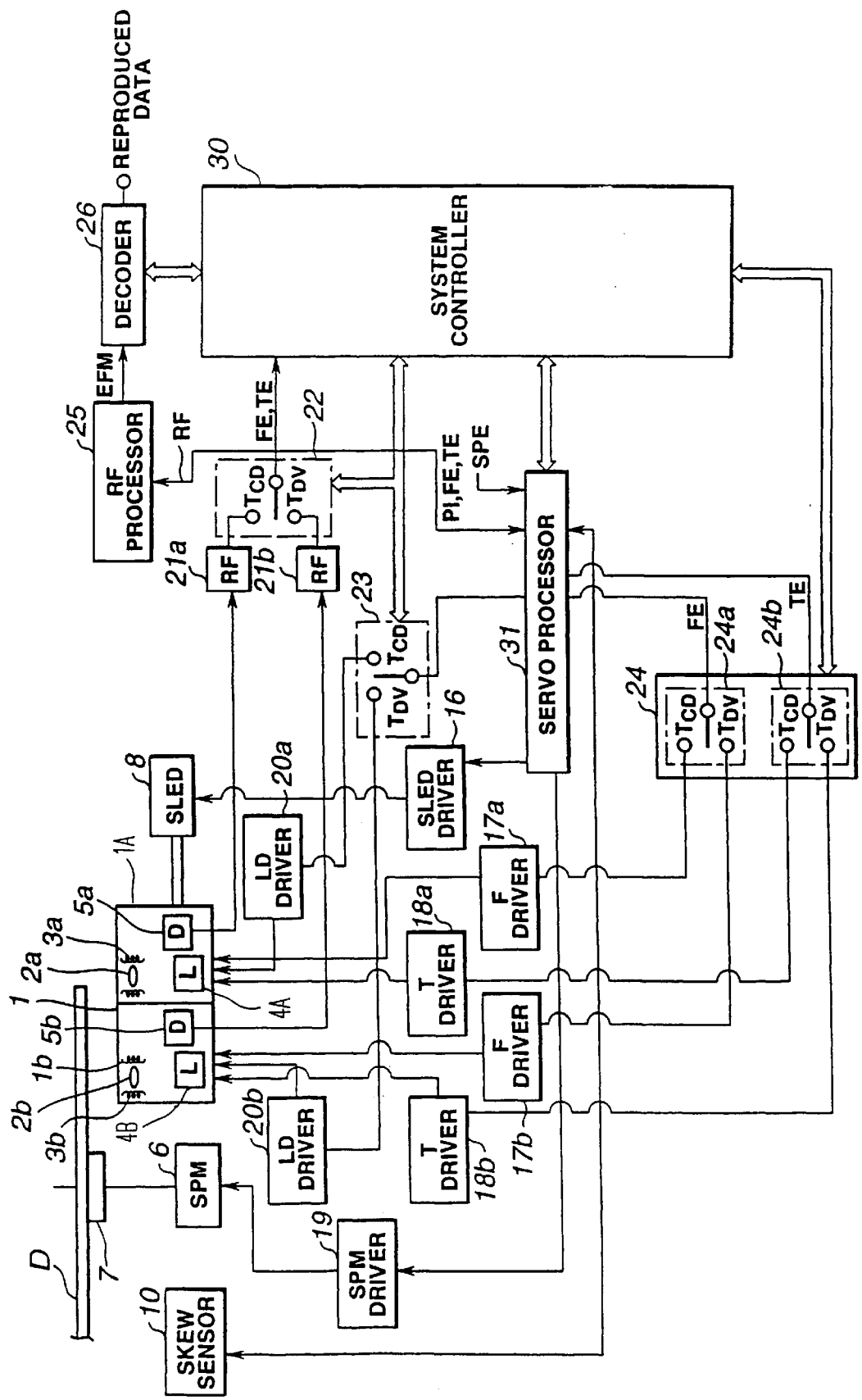
FIG. 3 is a block diagram of essential parts of the optical disc drive of the present invention.

The pickup unit 1 moves has a skew sensor 10 as shown in FIG. 3 to detect a tilt of the pickup unit 1 relative to a disc D on the turntable 7. The skew sensor 10 detects such a skew, namely, a tilt of the disc D with respect to the optical axis of the objective lens, through measurement of a quantity of reflected light, or return beam, from the disc D by a two-element or binary detector. By driving a skew motor which is to adjust, for example, a tilt of the pickup unit 1 based on a skew state detected by the skew sensor 10, the tilt of the pickup unit 1 can be adjusted to that of the loaded disc D; for thereby eliminating a tilt of the pickup unit 1 relative to the disc D.

FIG. 3 is a block diagram of essential parts of the optical disc drive according to the present invention.

A disc D is placed on the turntable 7 also shown in FIG. 2. To read data, the disc D is spun by the spindle motor 6 at a constant linear velocity (CLV) or constant angular velocity (CAV).

Thus the pickup unit 1 reads data recorded in the form of pits on the disc D. As mentioned above, the pickup unit 1 includes two types of pickup: CD pickup 1a and DVD pickup 1b, to be used independently of each other.

The CD pickup 1a has an optimum optical system for the CD 100 and CD-R 110. In the optical system, a laser diode 4a as laser source provides a laser beam of, for example, 780 nm in central wavelength, and a CD objective lens 2a has a numerical aperture (NA) of 0.45. The CD objective lens 2a is held by a biaxial mechanism 3a for movement in tracking and focusing directions.

The DVD pickup 1b has an optimum optical system for the DVD 120. In this optical system, a laser diode 4b as laser source provides a laser beam of, for example, 650 or 635 nm in central wavelength, and a DVD objective lens 2b has a numerical aperture (NA) of 0.6. The DVD objective lens 2b is held by a biaxial mechanism 3b for movement in tracking and focusing directions.

For a disc D being the CD 100 (or CD-R 110), the CD pickup 1a is used for data reading from the disc D. Information contained in reflected light or a return beam from the disc D is detected by a detector 5a, converted to an electric signal corresponding to a detected quantity of light, and supplied to an RF amplifier 21a.

For a disc D being the DVD 120, the CD pickup 1a is used for data reading from the disc D. Information in reflected light from the disc D is detected by a detector 5b, converted to an electric signal corresponding to a detected quantity of light, and supplied to an RF amplifier 21b.

Each of the RF amplifiers 21a and 21b is comprised of a current-voltage conversion circuit, amplifier circuit, matrix calculation circuit, etc. to produce necessary signals based on signals from the detectors 5a and 5b, such as an RF signal (data to be reproduced), a focus error signal FE used for servo control, a tracking error signal TE, a pull-in signal PI being a so-called sum signal, etc.

Figure 4:
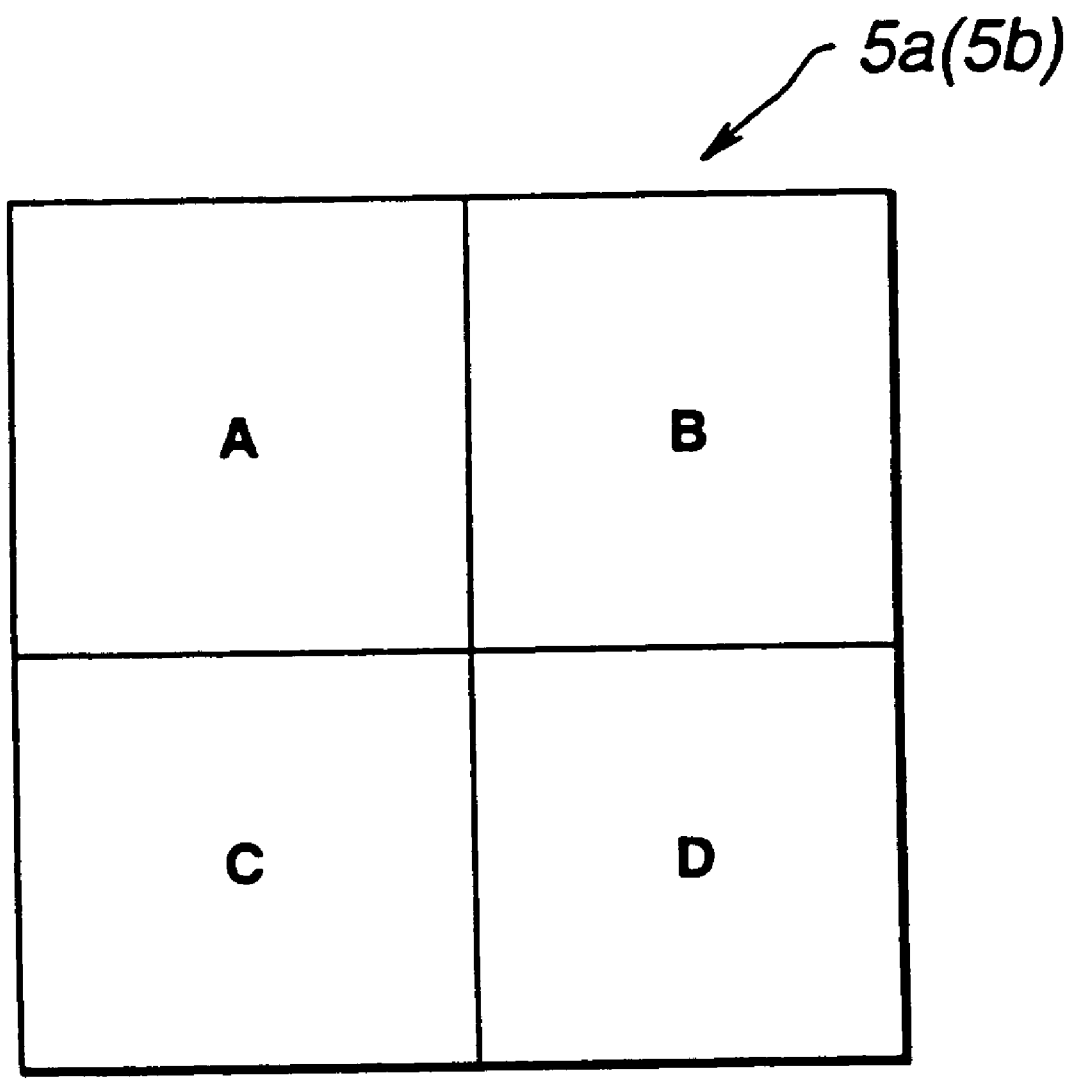
FIG. 4 is an explanatory drawing of a quadrature detector employed in the optical disc drive of the present invention.

As the detectors 5a and 5b, a so-called quadrature or quad detector which consists of four detector elements A, B, C and D, as shown in FIG. 4, is used. With this detector, a focus error signal FE is generated through a calculation (A+C)−(B+D) of the outputs from the quad detector using a so-called astigmatism. Also, a pull-in signal PI is generated as a result of a calculation (A+B+C+D) in a similar manner.

The tracking error signal TE may be generated through a calculation (E−F) of outputs from side-spot detectors E and F provided beside the quad detector shown in FIG. 4 with a so-called three-beam method taken in consideration, or it may be generated as a push-pull signal or the like from the quad detector.

Referring to FIG. 3, various signals generated by the RF amplifier 21a are supplied via a switch 22 to an RF processor 25, servo processor 31 and system controller 30. For a disc D being the CD 100, the switch 22 is placed in a position $T_{CD}$ for the RF amplifier 21a. The RF signal (data to be reproduced) from the RF amplifier 21a is supplied to the RF processor 25, and focus error signal FE, tracking error signal TE and pull-in signal PI are given to the servo processor 31, and pull-in signal PI and tracking error signal TE are further supplied to the system controller 30.

Also, a variety of signals generated by the RF amplifier 21b are supplied via the switch 22 to the RF processor 25, servo processor 31 and system controller 30. For a disc D being the DVD 120, the switch 22 is placed in a position $T_{DV}$ for the RF amplifier 21b. The RF signal (data to be reproduced) from the RF amplifier 21b is supplied to the RF processor 25, focus error signal FE, tracking error signal TE and pull-in signal PI are supplied to the servo processor 31, and pull-in signal PI and tracking error signal TE are further supplied to the system controller 30.

The RF signal (data to be reproduced) derived from the RF amplifier 21a or 21b is binary-coded or otherwise processed by the RF processor 25 into a so-called EFM signal (eight-of-fourteen modulated signal for CD) or EFM+ signal (eight-of-sixteen modulated signal for DVD), and supplied to a decoder 26. The decoder 26 effects EFM modulation, CIRC decoding, etc. and also CD-ROM decoding, MPEG decoding, etc. as necessary, to reproduce information read from the disc D.

The servo processor 31 generates focus, tracking, sled and spindle servo drive signals from a focus error signal FE and tracking error signal TE from the RF amplifiers 21a and 21b, and from spindle error signal SPE, etc. derived from the decoder 26 or system controller 30, respectively, to perform servo operations.

Figure 5:
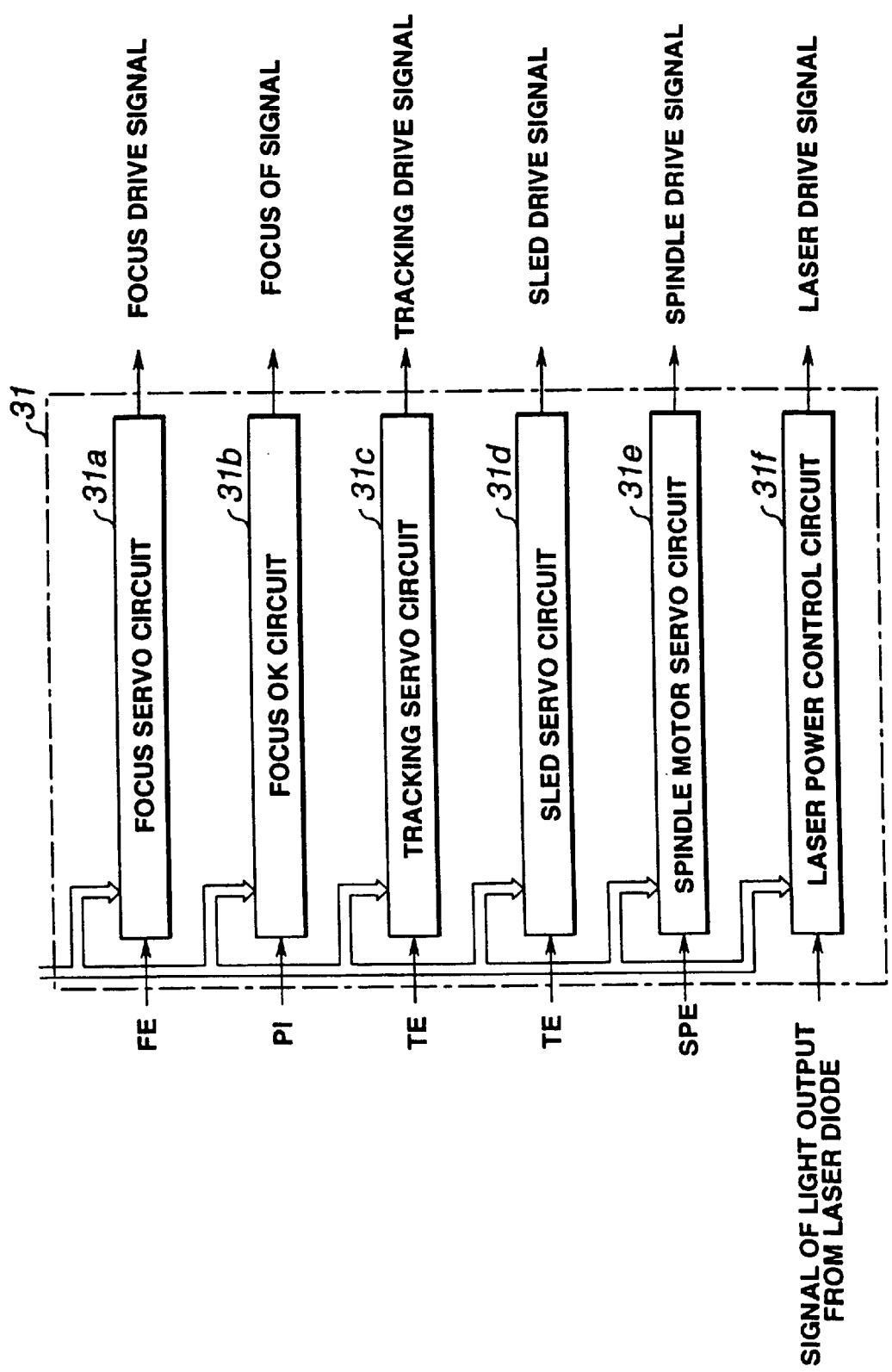
FIG. 5 is a block diagram of a servo processor used in the optical disc drive of the present invention.

As seen from FIG. 5, the servo processor 31 comprises a focus servo circuit 31, focus OK circuit 31b, tracking servo circuit 31c, sled servo circuit 31d, spindle motor servo circuit 31e, and a laser power control circuit 31f. Each of these control circuits in the servo processor 30 is supplied, and controlled, with a control signal from the system controller 30.

The focus servo circuit 31a is supplied with a focus error signal FE. Then, based on the supplied focus error signal FE, the circuit 31a will generate a focus drive signal which will be supplied via a selector 24 to focus drivers 17a and 17b which will thus be controlled to focus the laser beam on the signal plane 102 (or 112 or 122) of the disc D. It should be noted that the focus servo circuit 31a controls the focus servo with a predetermined phase characteristic by means of, for example, a DSP or the like. The system controller 30 changes the phase characteristic based on the type of a disc D loaded in the optical drive. The focus servo circuit 31a has the focus servo control start-timing (focus servo loop turn-on timing) thereof controlled by the system controller 30. The control of the focus servo loop turn-on timing, namely, focus servo pull-in operation, will further be described later.

The focus OK circuit 31b is supplied with a pull-in signal PI and produces a focus OK signal based on the pull-in signal PI. The focus OK signal is indicative of a window of time for starting a focus servo control by the focus servo circuit 31a at a stage of focus search. More specifically, the focus OK circuit 31b detects, through comparison of a pull-in signal PI with a predetermined threshold by a comparator or the like, whether the laser beam is illuminated to the detector in a quantity above a predetermined level, and produces a focus OK signal when the detected quantity of light is above the predetermined level. The focus OK signal is supplied to the system controller 30 which in turn will control the operation of pulling in the focus servo.

The tracking servo circuit 31c is supplied with a tracking error signal TE, and produces a tracking drive signal based on the supplied signal TE. This tracking drive signal is supplied to tracking drivers 18a and 18b which will thus be controlled to allow the laser beam to fall precisely on a selected track in the signal plane 102 (or 112 or 120) on the disc D. Note that the tracking servo circuit 31c controls the tracking servo with a predetermined phase characteristic by means of, for example, a DSP or the like. The system controller 30 changes the phase characteristic based on the type of a disc D loaded in the optical drive. Also, the tracking servo circuit 31c is controlled by the system controller 30. It is supplied, from the system controller 30, with a signal indicative of a track jump destination, etc. to which the track is to jump. Track control is done with this track jump destination signal.

The sled servo circuit 31d is supplied with, for example, a tracking error signal TE and a control signal supplied from the system controller 30 to generate a sled error signal. A sled drive signal is produced based on the sled error signal. The sled servo circuit 31d supplies the sled drive signal to a sled driver 16.

The spindle motor servo circuit 31e is supplied with a spindle error signal SPE, and produces a spindle drive signal based on the supplied signal SPE. The circuit 31e will supply the spindle drive signal to a spindle motor driver 19.

The laser power control circuit 31f receives a signal of detected laser output from laser diodes 4a and 4b. The laser diodes 4a and 4b have such a negative thermal characteristic that when driven with a constant current, they will provide a large optical output. Therefore, the laser power control circuit 31f follows an instruction from the system controller 30 to control the laser diodes 4a and 4b for a constant laser output. The signal of detected laser beam output supplied to the laser power control circuit 31f is an output from a monitoring photodiode, for example, which detects the laser outputs from the laser diodes. The laser power control circuit 31f produces a laser drive signal to laser drivers 20a and 20b via a switch 23.

More particularly, referring again to FIG. 3; the servo processor 31 comprising the above-mentioned control circuits produces and delivers a focus drive signal and tracking drive signal correspondingly to the focus error signal FE and tracking error signal TE, respectively, to a selector 24 consisting of switches 24a and 24b each having terminals $T_{CD}$ and $T_{DV}$. For a disc D being the CD 100, the terminals $T_{CD}$ of the switches 24a and 24b are selected. For a disc D being the DVD 120, the terminals $T_{DV}$ of the switches 24a and 24b are selected.

Accordingly, to read back the CD 100, a focus drive signal generated correspondingly to a tracking error signal TE from the RF amplifier 21a is supplied to the focus driver 17a which in turn will drive the biaxial mechanism 3a of the CD pickup 1a. Thereby, the CD pickup 1a, RF amplifier 21a, servo processor 31 and focus driver 17a will form together a focus servo loop.

Also, when reading the CD 100, a tracking drive signal generated correspondingly to a tracking error signal TE from the RF amplifier 21a is supplied to the tracking driver 18a which in turn will drive the biaxial mechanism 3a of the CD pickup 1a, whereby the CD pickup 1a, RF amplifier 21a, servo processor 31 and tracking driver 18a will form together a tracking servo loop.

Furthermore, when reading the DVD 120, a focus drive signal generated by the servo processor 31 correspondingly to a focus error signal FE from the RF amplifier 21b is supplied to the focus driver 17b which in turn will drive the biaxial mechanism 3b of the DVD pickup 1b, whereby the DVD pickup 1b, RF amplifier 21b, servo processor 31 and focus driver 17b form together a focus servo loop.

To read back the DVD 120, a tracking drive signal generated by the servo processor 31 correspondingly to a tracking error signal FE from the RF amplifier 21b is supplied to the tracking driver 18b which in turn will drive the biaxial mechanism 3b of the DVD pickup 1b, whereby the DVD pickup 1b, RF amplifier 21b, servo processor 31 and tracking driver 18b form together a tracking servo loop.

The servo processor 31 supplies the spindle motor driver 19 with a tracking drive signal generated correspondingly to a spindle error signal SPE. Based on the supplied signal SPE, the spindle motor driver 19 will apply, for example, a three-phase drive signal to the spindle motor 6 which will thus be made to rotate at a CLV (constant linear velocity). Further, the servo processor 31 receives a spindle error signal from the system controller 30a to produce a corresponding spindle drive signal which allows the spindle motor driver 19 to start or stop the spindle motor 6.

Based on, for example, a sled error signal derived from a tracking error signal TE, an access execution control from the system controller 30, and so on, the servo processor 31 produces a sled drive signal to the sled driver 16 which in turn will drive the sled mechanism 8 correspondingly to the supplied sled drive signal. As shown in FIG. 2, the sled mechanism 8 is a block including the main shaft 8a, sled motor 8b, sled transmission gears 8c, 8d and 8e, etc. That is to say, as the sled driver 16 drives the sled motor 8b correspondingly to a supplied sled drive signal, the pickup unit 1 is allowed to correctly slide on the main and sub shafts.

Also, based on an instruction from the system controller 30 and a detected laser output from the laser diodes 4a and 4b, the servo processor 31 produces a laser drive signal to the switch 23. For a disc D being the CD 100, the terminals $T_{CD}$ of the switch 23 are selected. For a disc D being the DVD 120, the terminals $T_{DV}$ of the switch 23 are selected. Therefore, any of the laser diodes 4a and 4b emits a laser beam correspondingly to a disc D to be read.

The servo processor 31 is also supplied with detected information from a skew sensor 10 to drive the skew motor correspondingly to the detected information from the skew sensor 10.

The above operations such as servo control and decoding are controlled by the system controller 30 implemented by a microcomputer.

The system controller 30 receives a focus error signal FE and tracking error signal TE from the RF amplifiers 21a and 21b via the switch 22. Having an internal analog-digital converter, the system controller 30 detects the focus error signal FE and tracking error signal TE, and acquires them as data.

The system controller 30 controls the operations of the servo processor 31 and pickup unit 1 to achieve, for example, replay start and stop, track access, fast forward replay and fast reverse replay, etc.

The optical disc drive is compatible with both CD and DVD. Therefore, the system controller 30 has also to discriminate which a disc D loaded in the drive is, CD 100 or DVD 120. To this end, the system controller 30 places the switches 22, 23 and switches 24a and 24b of the selector 24 to either the terminal $T_{CD}$ or $T_{DV}$ based on a result of disc discrimination for appropriate actuation of a pickup 1a or 1b, RF amplifiers 21a and 21b, laser drivers 20a and 20b, and tracking drivers 18a and 18b provided as dedicated for the CD 100 and DVD 120, respectively. The disc discrimination by the system controller 30 will be further described later.

Next, the optical drive compatible with both CD and DVD, embodied as in the foregoing, will be described herebelow concerning the focus servo control and pull-in of the focus servo.

As having previously been described, the CD 100 and CD-R 110 have their signal planes 102 and 112, respectively, at a position of about 1.2 mm from the disc faces 105a and 116, respectively. On the other hand, the DVD 120 has the signal plane 122 at a position of about 0.6 mm from the disc face 128.

For the sake of explanation, the CD 100 and CD-R will also be referred to as 1.2 mm single-plate disc while the DVD 120 be as 0.6 mm laminated disc.

The objective lens 2a in the CD pickup 1a is moved in a direction toward and/or away from the 1.2 mm single-plate disc CD 100, as shown in FIGS. 6A to 6C, so that the laser beam is perfectly focused on the signal plane 102 in the CD 100.

Also, the objective lens 2b in the DVD pickup 1b is moved in a direction toward and/or away from the 0.6 mm laminated disc DVD 120, as shown in FIGS. 7A to 7D, so that the laser beam is in perfect focus on the signal plane 122 of the DVD 120.

Each of the CD and DVD objective lenses 2a and 2b is moved from a bottom position shown in FIGS. 6A and 7A to a top position shown in FIGS. 6D and 7D within a focus searching range (stroke). The focus searching range is approximately 0.9 mm on an assumption that the perfectly focused position as in FIGS. 6C and 7C is taken as an initial reference position.

If the objective lens 2 (CD objective lens 2a or DVD objective lens 2b) can be displaced to a position relative to the CD 100 or DVD 120 as shown in FIGS. 6A to 6D and 7A to 7D, a focus error signal FE and tracking error signal TE for each of the positions the objective lens takes will be obtainable as information on reflected light from the disc D.

Also, since the reflected light at an optimum level can be detected when the laser beam is nearly perfectly focused as shown in FIGS. 6C and 7C, a reflected light having the shape of an S-curve can be detected as a focus error signal FE and a reflected light of an increased amplitude level can be detected as a pull-in signal PI. When the laser beam is in perfect focus on the disc face 105 (or 128) as shown in FIGS. 6B and 7B, a reflected light from the disc face 105 (or 128) can be detected as well though its reflectance is low, so that a reflected light having the shape of a small S-curve will be detected as a focus error signal FE and a reflected light having a low amplitude level can be detected as a pull-in signal PI.

It should be noted that with the DVD pickup 1b for the DVD 120, the perfectly focused point is such that the laser beam is focused on the signal plane 122 of the DVD 120 being a 0.6 mm laminated disc and its position in the direction of the disc thickness is off the perfectly focused point for the CD 100, as shown in FIG. 7C.

For such a focus servo control, the focus servo is pulled in first. This pull-in operation will result in a triangular wave as shown in FIG. 8A, which will be a focus drive signal, and in a forced move of the objective lens 2a (or 2b) in the direction of the optical axis within the focus searching range or stroke. Then, a reflected light having an S-curved shape as shown in FIG. 8B is detected as a focus error signal FE. The focus search will be effected within a focus servo pull-in range being a linear area of the S-curve, namely, within a range in which a focus OK signal as shown in FIG. 8C is generated and the focus error signal FE is about to cross the zero point. It should be noted that the focus OK signal represents that the pull-in signal level is higher than predetermined as mentioned in the foregoing. When the focus servo loop is turned on within the focus servo pull-in range shown in FIG. 8D, a focus servo control for subsequent perfect-focusing is assured.

Next, the system controller 30 will function to discriminate a loaded disc D as will be described below:

For such a disc discrimination by the system controller 30, only the CD pickup 1a is used to discriminate which a disc D loaded in the optical disc drive is, CD 100 (or CD-R 110) or DVD 120. More specifically, the CD objective lens 2a is forced to move as in the focus servo pull-in operation in order to move the pickup 1a radially of the disc D if a focus error signal FE is the one detected when the laser beam is nearly in perfect focus, thereby detecting a tracking error signal TE. If such a tracking error signal TE is detected, the disc D loaded will be judged to be the CD 100 (or CD-R 110). If not, the disc D will be judged as the DVD 120.

Namely, the disc discrimination by the system controller 30 is achieved by utilizing the fact that the CD 100 (or CD-R 110) is different in track pitch from the DVD 120. More specifically, a tracking error signal FE is generated through a calculation (E−F) of outputs from side-spot detectors E and F provided if a so-called three-beam method is adopted, and also it is generated as a push-pull signal, etc. from the quad detector. Thus, if a tracking error signal for the DVD 120 is detected when the CD pickup 1a is used, no tracking error signal can be detected for the track pitch of the DVD 120 is one half or less of that of the CD 100 (or CD-R 120). Therefore, by detecting a tracking error signal when the objective lens 2a is in a nearly perfectly focused point, it is possible to discriminate which the loaded disc D is, CD 100 (or CD-R 110) or DVD 120.

Figure 9:
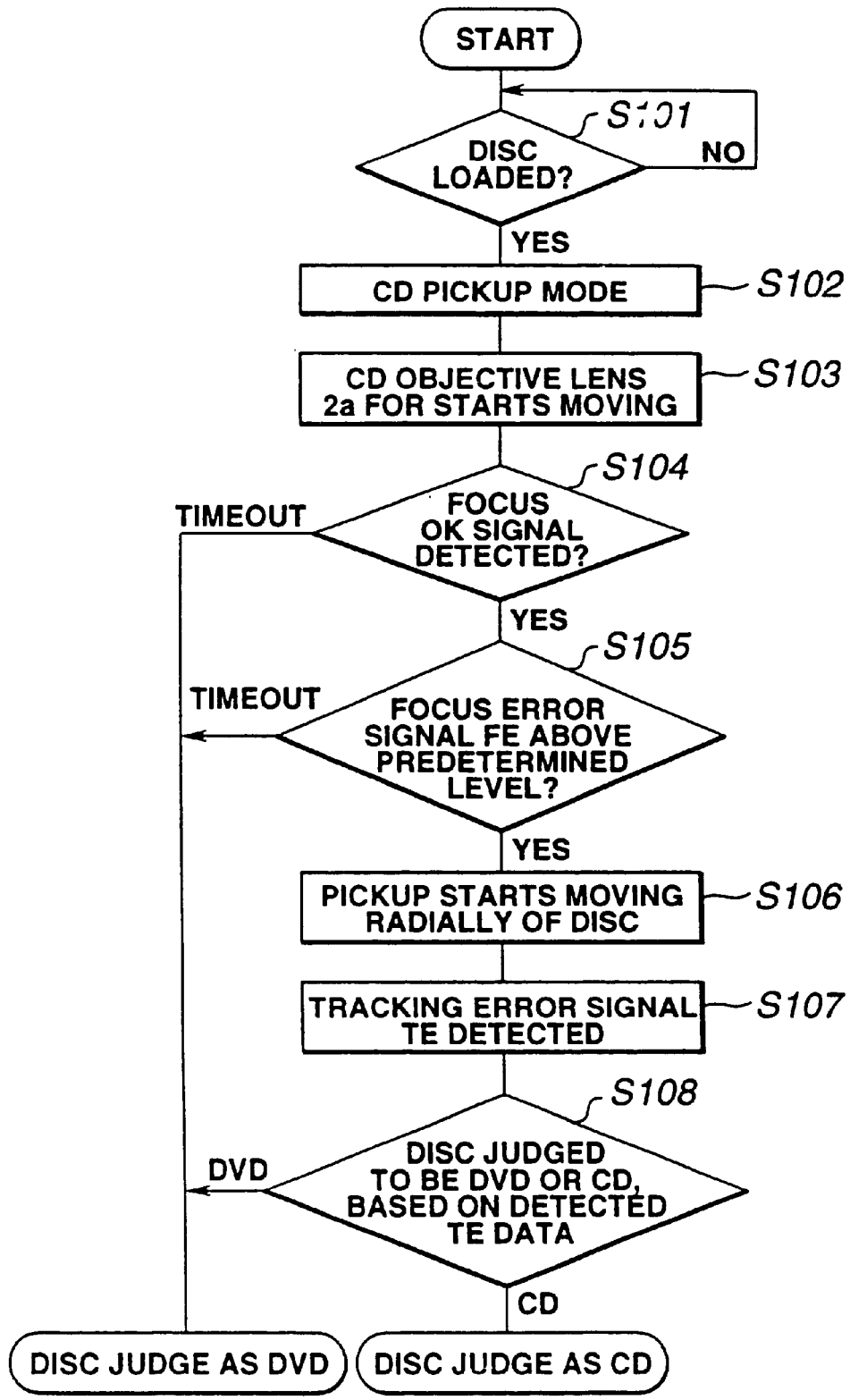
FIG. 9 is a flow chart of disc discriminating operations of a system controller used in the optical disc drive of the present invention.

Such a disc discrimination by the system controller 30 will further be described below with reference to the flow chart in FIG. 9.

After the power is turned on and various parameters are initially set, the system controller 30 will wait until a disc D is loaded into the optical disc drive at a step S101.

On loading a disc D, the operation proceeds to a step S102 where a CD pickup mode is set in which the CD pickup 1a is usable. Namely, the mode should be one in which the switches 22, 23, and switches 24a and 24b of the selector 24 are connected to the terminal $T_{CD}$. Thereafter, the operation proceeds to a step S103.

At the step S103, the CD objective lens 1a is forced to move up or down within the focus searching (stroke) range as in the focus servo pull-in operation. That is, the system controller 30 instructs the servo processor 31 to start delivery of a focus search drive signal as shown in FIG. 8A. Note that the laser diode 4a will also start emitting a laser beam at this time.

While allowing the CD objective lens 1a to move up (or down) within the focus searching range (stroke), the system controller 30 will acquire a focus OK signal as shown in FIG. 8C from the servo processor 31 at a step S104. If no focus OK signal is detected for a predetermined period of time, for example, 800 ms, the loaded disc D is judged as being the DVD 120 and the operation is terminated. This is because if the loaded disc is a double-layer one having two signal planes, no sufficient quantity of laser beam is reflected from the recording layer, so that a pull-in signal PI available at this time has such an amplitude considerably smaller than with the CD 100 as not to reach a requisite threshold for production of a focus OK signal. Therefore, when no focus OK signal can be detected at the step S104, the disc D loaded will be judged to be the DVD 120.

When a focus OK signal can be detected, it is judged at a next step S105 whether the level of a focus error signal FE supplied to the system controller 30 is higher than predetermined (for example, 200 mV). This means that for the system controller 30 to detect a tracking error signal TE, the CD objective lens 2a should be located at a position near the perfectly focused point. Therefore, it is judged at this step S105 whether the CD objective lens 2a is present at such a location. If the focus error signal FE does not continuously keep a level higher than predetermined for a predetermined period of time, the loaded disc D is judged to be the DVD 120 and the operation is terminated. When there is not available a focus error signal FE having a level higher than predetermined, the disc D is judged to be the DVD 120 for the reason that no sufficient laser beam is reflected from the recording layer of the disc D.

When a focus error signal FE can be detected because the objective lens 2a is located near the perfectly focused point, the sled driver 16 is supplied with a sled drive signal being a sled kick signal to drive the sled mechanism 8, thereby moving the CD pickup 1a radially of the disc D, at a step S106. Thus, the laser beam illuminated onto the disc D will move over a plurality of tracks. It should be noted that the objective lens 2a may be directly moved radially relative to the disc D by driving the tracking driver 18a, not by driving the sled mechanism 8 to move the CD pickup 1a.

Also, if no tracking servo control is intended since the track on the disc D is usually eccentric, a tracking error signal TE (a so-called traverse signal) can be generated even with the objective lens 2a kept still. In this case, the sled mechanism 8 and tracking driver 18a need not be driven.

When the sled mechanism 18 is driven to put the CD pickup 1a into radial movement, the system controller 30 will detect a tracking error TE at a step S107.

Thereafter, it is judged based on the signal level of a detected tracking error signal TE at a step S108 which the loaded disc D is, a CD or DVD. The system controller 30 will sample the detected tracking error signal TE. If it is judged from the sampled data that the tracking error signal TE has a sufficient signal level, the system controller 30 will judge the loaded disc D as the CD 100 (or CD-R 110). With a judgment that no sufficient tracking error signal is generated, the system controller 30 will judge the loaded disc D as being the DVD 120.

As in the above, the optical disc drive according to the present invention is capable of discriminating an optical disc loaded therein by effecting the disc discriminating procedure through the steps S101 to S108.

Furthermore, to start a data read or write following the judgment of a loaded disc as the CD 100 (or CD-R 110) or DVD 120, the above step S108 may be followed by a pull-in operation to close the focus servo loop by a corresponding pickup.

Figure 10:
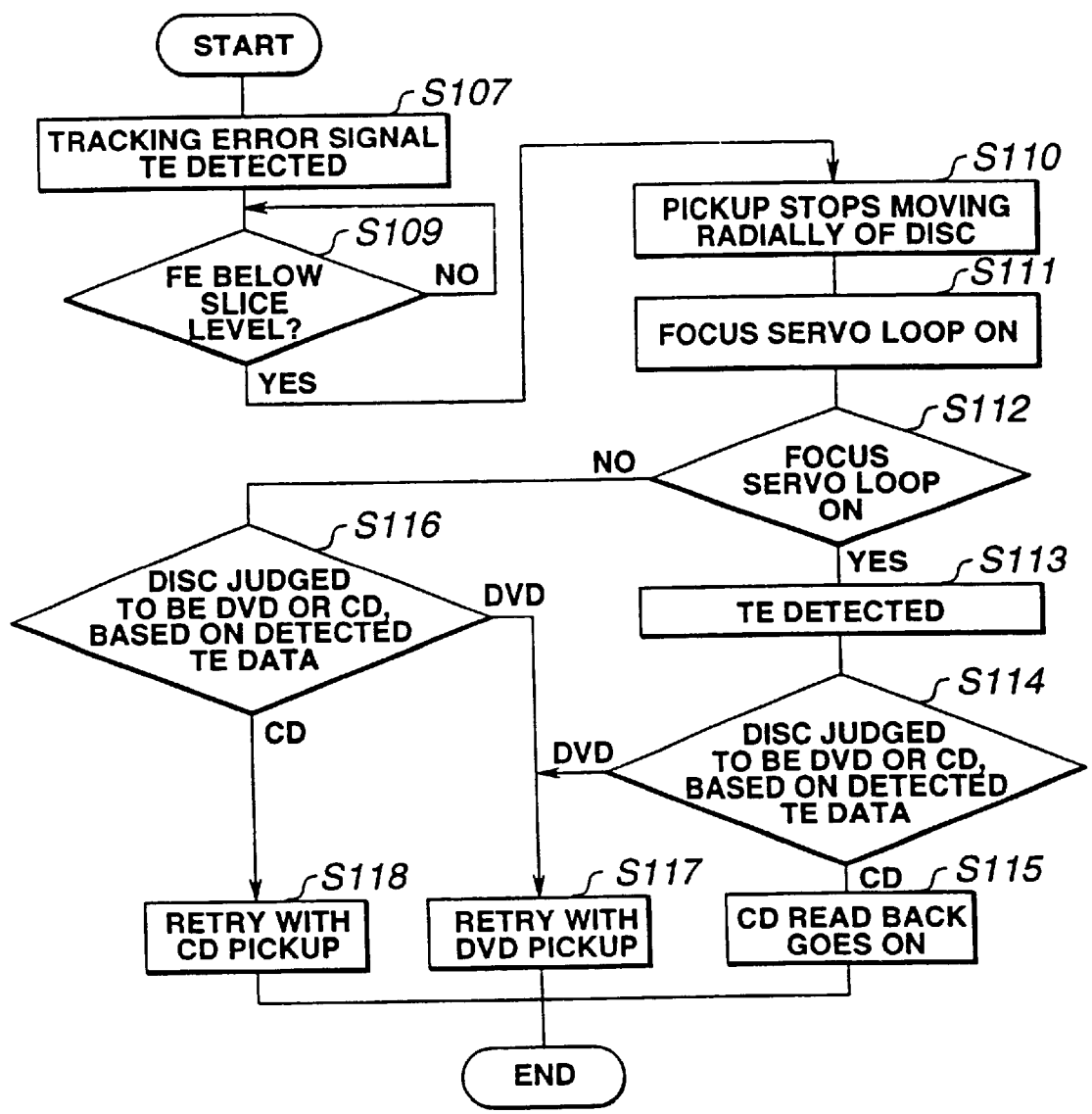
FIG. 10 is another flow chart of disc discriminating operations of a system controller used in the optical disc drive of the present invention.

In the procedure through the steps S101 to S108, the CD pickup 1a is used. Thus, if the loaded disc D is judged to be the CD 100 (or CD-R 110), a pull-in operation to close the focus servo loop can be effected simultaneously with the disc discrimination, to focus a laser spot on the signal plane 102 (or 112). The flow of operations for simultaneously discriminating the loaded disc and pulling in the focus servo will be described below with reference to the flow chart in FIG. 10.

First, the operations in the above-mentioned steps S101 to S107 are done.

If a tracking error signal TE can be detected at the step S107, it is judged at a step S109 whether the focus error signal FE has a level higher than predetermined. It should be noted that in this step S109, it is not judged, by sampling data from the detected tracking error signal TE, which the loaded disc D is, CD 100 (or CD-R 110) or DVD 120. The level of a focus error signal FE is judged to be lower than predetermined or not for the focus servo loop cannot be pulled in when outside a focus servo pull-in range being a linear area of the S-curve, namely, within a range in which a focus OK signal as shown in FIG. 8C is generated and the focus error signal FE is about to cross the zero point. If the level of the focus error signal FE is judged, at the step S109, to be lower than predetermined, the pickup 2a having started moving radially of the disc D at the step D106 is stopped from moving at a step S110.

When the pickup 2a is stopped from moving, the focus servo loop is turned on at a next step S111.

Then, it is judged at a further step S112 whether the focus servo loop has successfully been pulled in. More specifically, the judgment is effected by checking the focus OK signal. If it is judged that the focus servo loop has successfully been pulled in, the operation goes to a step S113; if not, however, the operation goes to a step S116.

At the step S113, detection of a tracking error signal TE is retried.

When a tracking error signal TE is detected again, the detected data is collected at a step S114 to judge the loaded disc D to be the CD 100 (or CD-R 110) or DVD 120. After completion of this judgment, readback of the CD 100 (or CD-R 110), if applied, is started at a step S115. Note that since the retry to detect tracking error signal TE at these steps S113 and S114 is just intended to confirm that the preceding procedure has successfully been done, the replay of the CD 100 may be started without retrying the tracking error signal detection.

At a next step S116, the disc D loaded is discriminated to be the CD 100 (or CD-R 110) or DVD 120 based on the data contained in the tracking error signal TE detected at the step S107. If the disc D is judged to be the CD 100 (or CD-R 110), the operation goes to a step S118 where disc replay or the like is started by retrying to pull in the focus servo loop by the CD pickup 2a. If the disc D is judged as the DVD 120, the operation goes to a step S117 where disc replay or the like is started by retrying to pull in the focus servo loop by the DVD pickup 2b.

As having been described in the foregoing, the optical disc drive according to the present invention can read or write data from or onto a previously loaded disc D in a reduced time since the disc discrimination and CD focus servo loop pull-in operation are done simultaneously in the procedure followed by the system controller 30 in the steps S101 through S118.

Figure 11:
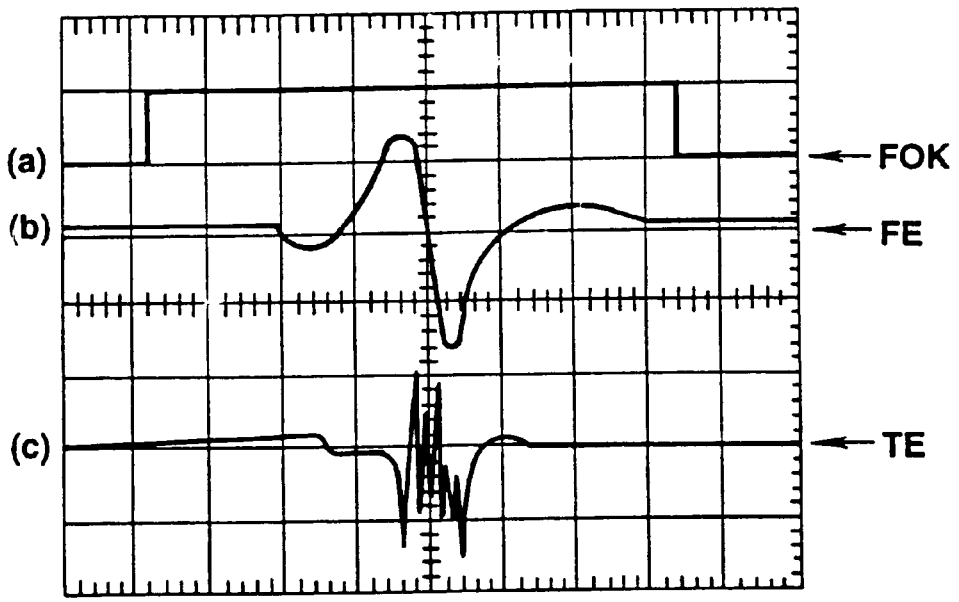
FIG. 11 shows waveforms of signals generated during disc discriminating operation of an optical disc drive embodied of the present invention.
Figure 12:
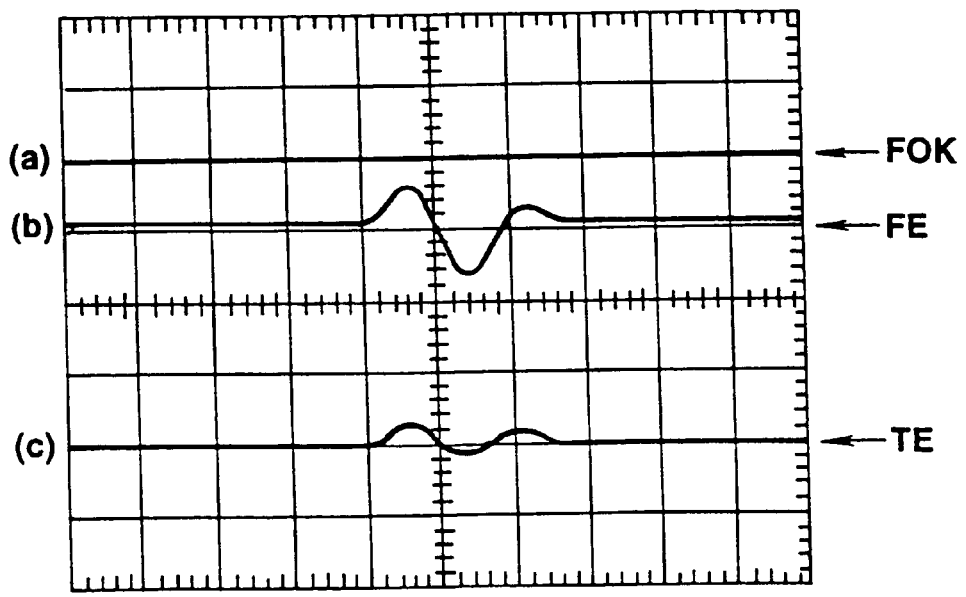
FIG. 12 also shows waveforms of signals generated during disc discriminating operation of an optical disc drive of the present invention.
Figure 13:
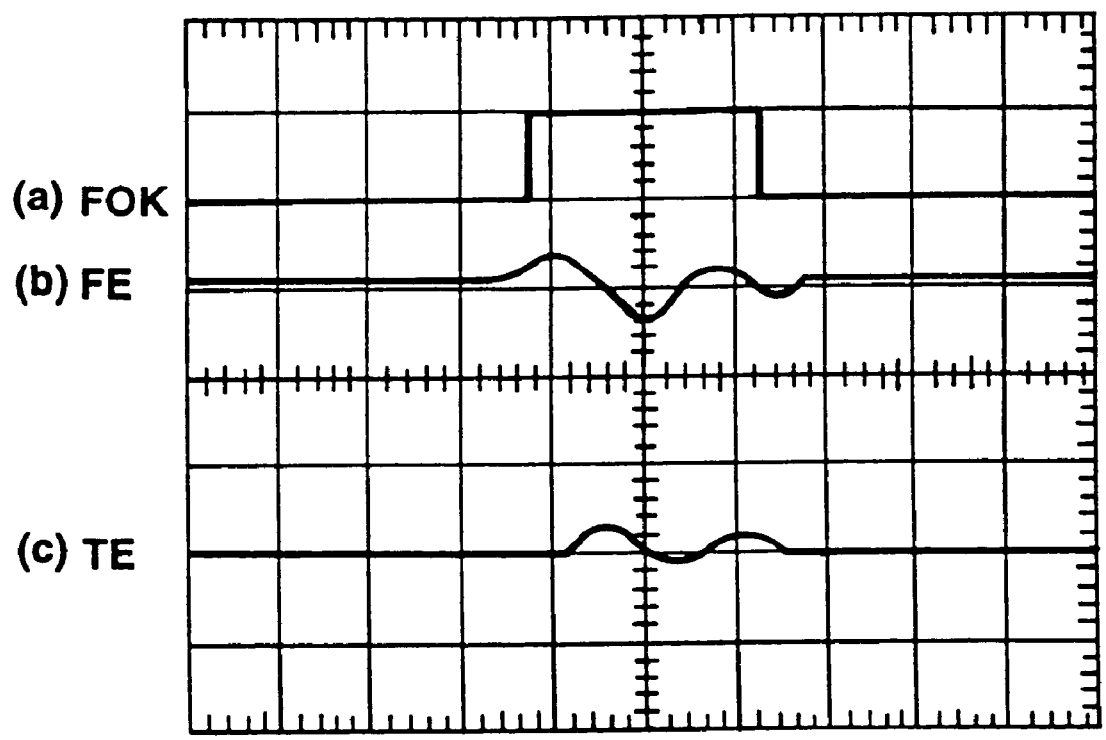
FIG. 13 shows waveforms of signals generated during disc discriminating operation of an optical disc drive of the present invention.

FIGS. 11 to 13 show waveforms of a focus OK signal, focus error signal FE and tracking error signal TE, respectively, generated by the system controller 30 when discriminating a loaded disc D. In FIGS. 11 through 13, the waveforms (a), (b) and (c) indicate a focus OK signal, focus error signal FE and a tracking error signal TE, respectively.

FIG. 11 shows waveforms observed when the loaded disc D is the CD 100 (or CD-R 110). When the CD 100 (or CD-R 110) is loaded in the optical disc drive according to the present invention, a tracking error signal TE indicated with (c) is generated as shown in FIG. 11. Thus, the loaded disc D can be judged to be the CD 100 (or CD-R 110) through detection of the tracking error signal TE.

FIG. 12 shows waveforms observed when the loaded disc D is a single-layer disc DVD 120. When the DVD 120 is loaded in the drive, a focus error signal FE indicated with (b) is generated of which the level is higher than predetermined. However, little tracking error signal TE is found in this case. Thus, the loaded disc D can be judged to be the DVD 120 through detection of the focus error signal FE.

In the aforementioned optical disc drive compatible with both CD and DVD, an embodiment of the present invention, the pull-in of the focus servo loop is started using only the CD pickup 1a, and a tracking error signal TE, generated when the pickup 1a comes to a position near the perfectly focused point, is detected. Through this detection of a tracking error signal TE, the loaded disc D is discriminated to be a CD or DVD. Thus, this optical disc drive can achieve disc discrimination without using any sensors or special parts for disc type discrimination, which means no addition to the costs of manufacturing the optical disc drive. Also, a high speed of disc discrimination can be attained as the disc discrimination is done by actuating only the CD pickup 1a. Further, with this optical drive, the time required until start of reading a previously loaded CD can be reduced since a simultaneity of the disc discrimination and focus loop pull-in can be attained.

In the foregoing, one embodiment of the optical disc drive according to the present invention has been described. However, the present invention is not limited only to this embodiment but may be modified or varied in many other forms without departing from the spirit and scope of the claimed inventions.

As one example of the possible embodiments of the present invention, an optical disc drive having two pickups 1a and 1b independent of each other has been described in the foregoing. However, one pickup as a whole may not be dedicated for each type of optical disc. In this case, only certain elements of the pickup including at least the laser source and objective lens are arranged for dedicated use with each type of optical disc while the other elements are commonly used for all types of optical discs.

Also, the present invention has been described with respect to an embodiment compatible with CD 100 (or CD-R 110) and DVD 120. However, such optical discs are not only limited to the CD 100 and DVD 120. They may include, for example, CD-ROM, CD-RAM to and from which data can be written and read, etc. and DVD-ROM, DVD-RAM, DVD-R, etc. as well. Namely, the method of disc discrimination included in the present invention may be applied for discrimination of an optical disc loaded in the optical disc drive to be one compatible or not with the optical drive.

What is claimed is:

1. An optical disc drive compatible with a plurality of types of optical discs of different track pitches to write and/or read data into and/or from a loaded one of such optical discs, comprising:
   a first pickup provided for a first optical disc having a first track pitch;
   a second pickup provided for a second optical disc having a second track pitch smaller than the first one;
   a focus servo circuit to control a focus servo of the first and second pickups and pull in the focus servo, based on a focus error signal;
   a tracking servo circuit to control tracking of the first and second pickups based on a tracking error signal; and
   a control circuit to start pulling in the focus servo using the first pickup with respect to a loaded optical disc, detect, based on the focus error signal resulting from the focus servo pull-in operation, that the first pickup is in a nearly perfect focus, and then move the first pickup radially relative to the disc when the first pickup is in the nearly perfect focus, and then judge the loaded optical disc as the first one when a tracking error signal is detected during the radial move of the first pickup, or as the second one when no tracking error signal is detected during the radial move of the first pickup,
   wherein said focus servo circuit closes a focus servo loop after said control circuit judges the loaded optical disc as the first one or as the second one.

2. The optical disc drive as set forth in claim 1, wherein the control circuit continues, when it judges the loaded optical disc as the first one, the operation, once started, of pulling in the focus servo using the first pickup.

3. The optical disc drive as set forth in claim 1, wherein the control circuit allows, when if judges the loaded optical disc as the first one, the focus servo circuit to effect the operation of pulling in the focus servo using the first pickup 4. The optical disc drive as set forth in calim 1, wherein the control circuit allows, when it judges the loaded optical disc as the second one, the focus servo circuit to effect the operation of pulling in the focus servo using the second pickup.

5. An optical disc drive compatible with a plurality of types of optical discs different recording densities to write and/or read data into and/or from a loaded one of such optical discs, comprising:
   an optical pickup provided with a first light source to provide a laser beam of a first wavelength, and a second light source to provide a laser beam of a second wavelength shorter than the first one, and which radiates a laser beam from the first or second light source to an optical disc loaded in the optical disc drive;
   a servo processor for controlling focus and tracking servos of the optical pickup based on a focus error signal and a tracking error signal both contained in the reflected beam from the optical disc; and
   a control circuit for discriminating the type of a loaded optical disc based on the level of the tracking error signal,
   wherein said control circuit starts pulling in the focus servo and detects that the optical pickup is in nearly perfect focus, and then moves the optical pickup radially relative to the disc, and then judges the loaded optical disc as being a first one of said plurality of types of optical discs based on a level of said tracking error signal detected during the radial move of the optical pickup, and
   wherein said servo processor closes a focus servo loop after said control circuit judges the loaded optical disc as being the first one.

6. The optical disc drive as set forth in claim 5, wherein the level of the tracking error signal is determined based on a measurement of the amount of the return beam from the optical disc.

7. The optical disc drive as set forth in claim 5, wherein the optical discs include a first optical disc having a first track pitch and a second optical disc having a second track pitch smaller than the first one, and wherein the optical pickup includes a first objective lens corresponding to the first optical disc and a second objective lens corresponding to the second optical disc.

8. The optical disc drive as set forth in claim 5, wherein the optical discs include a first optical disc having a first track pitch and a second optical disc having a second track pitch smaller than the first one, and wherein the optical pickup includes an objective lens, wherein the control circuit allows the optical pickup to radiate a laser beam from the first light source to one of the first and second optical discs through the objective lens, and controls the servo processor to move the objective lens in a first direction substantially normal to a signal plane of the optical disc prior to moving the optical pickup radially relative to the disc.

9. The optical disc drive as set forth in claim 8, wherein the control circuit fails to judge a loaded optical disc to be the first or second one based on the level of a focus error signal generated during the move of the objective lens in the first direction prior to moving the optical pickup radially relative to the disc.

10. The optical disc drive as set forth in claim 8, wherein the control circuit further controls the servo processor to move in a second direction along the radius of the optical disc during the move of the objective lens in the first direction, and thus judges a loaded optical disc to be the first one or not based on the level of a tracking error signal generated during the move of the objective lens in the second direction.

11. The optical disc drive as set forth in claim 8, wherein the control circuit discriminates a loaded optical disc to be the first one or not, based on the level of a tracking error signal generated during the move of the objective lens in the first direction.

12. The optical disc drive as set forth in claim 11, wherein the control circuit controls the servo processor to close a focus servo loop by driving the objective lens after the loaded optical disc is discriminated to be the first optical disc.

13. A method of discriminating a plurality of optical discs of different track pitches, comprising the steps of:
moving an objective lens in a first direction substantially normal to a signal plane of an optical disc loaded in an optical disc drive;
radiating a laser beam from a light source to the signal plane of the optical disc through the objective lens;
detecting a focus error signal when said objective lens is moved;
detecting a tracking error signal contained in a reflected beam from the signal plane;
discriminating between the plurality of optical discs based on a level of a detected tracking error signal; and
closing a focus servo loop after said discriminating step.

14. The method as set forth in claim 13, wherein the step of moving an objective lens comprises:
moving the objective lens in a second direction radially relative to the optical disk and along said signal plane of said optical disc.

15. The method as set forth in claim 13, wherein the step of radiating comprises:
radiating with an objective base and a laser beam wavelength which corresponds to an optical disc of a predetermined track pitch.

16. The method as set forth in claim 14, wherein the step of moving an objective lens comprises:
moving the objective lens in the first direction prior to moving an optical pickup in the second direction.

17. The method as set forth in claim 16, wherein the step of discriminating comprises:
judging whether a loaded optical disc is a first optical disc or a second optical disc based on a level of a focus error signal generated during the moving of the objective lens in the first direction prior to moving the optical pickup in the second direction.

18. The method as set forth in claim 16, wherein the step of moving an objective lens comprises:
moving the objective lens in the second direction during the moving of the objective lens in the first direction; and
judging whether a loaded optical disc is a first optical disc or a second optical disc based on a level of a tracking error signal generated during the moving of the objective lens in the second direction.

19. The method as set forth in claim 16, wherein said step of discriminating comprises:
determining whether a loaded optical disc is a first optical disc or a second optical disc based on a level of a tracking error signal generated during the moving of the objective lens in the first direction.

20. The method as set forth in claim 19, wherein the step of closing a focus servo loop includes:
driving the objective lens in said first direction after the loaded optical disc is determined to be the first optical disc.

21. An optical disc drive compatible with a plurality of types of optical discs of different recording densities to write and/or read date onto and/or from a loaded one of such optical discs, comprising:
an optical pickup provided with a first light source to provide a laser beam of a first wavelength, a second light source to provide a laser beam of a second wavelength shorter than the first wavelength, and an objective lens which radiates a laser beam from the first or second light source to an optical disc loaded in the optical disc drive;
a sled mechanism for moving the objective lens in a first direction substantially normal to a signal plane of the optical disc;
a biaxial mechanism for moving the objective lens in a second direction along the radius of the optical disc;
a servo processor for controlling the sled and biaxial mechanisms based on a focus error signal and a tracking error signal both contained in a reflected beam from the optical disc to perform focus and tracking servos of the optical pickup; and
a discriminating circuit for discriminating the type of a loaded optical disc based on the level of the tracking error signal,
wherein when a level of the focus error signal exceeds a predetermined level during moving of the objecting lens in the first direction, said sled mechanism moves the objective lens in said second direction so that said discriminating circuit discriminates the type of the optical disc, and
wherein said servo processor closes a servo loop of the focus servo when said discriminating circuit discriminates the type of the optical disc.

22. The optical disc drive as set forth in claim 21, wherein the optical discs include a first optical disc having a first track pitch and a second optical disc having a second track pitch smaller than the first one, and wherein the discrimination circuit allows the optical pickup to radiate a laser beam from the first light source to one of the first and second optical discs through the objective lens, and controls the servo processor to move the objective lens in the first direction prior to moving the optical pickup radially relative to the disc.

23. The optical disc drive as set forth in claim 22, wherein the discrimination circuit fails to judge a loaded optical disc to be the first or second one based on the level of a focus error signal generated during the move of the objective lens in the first direction prior to moving the optical pickup radially relative to the disc.

24. The optical disc drive as set forth in claim 22, wherein the discrimination circuit further controls the servo processor to move in the second direction along the radius of the optical disc during the move of the objective lens in the first direction, and thus judges a loaded optical disc to be the first one or not based on the level of a tracking error signal generated during the move of the objective lens in the second direction.

25. The optical disc drive as set forth in claim 22, wherein the discrimination circuit discriminates a loaded optical disc to be the first one or not, based on the level of a tracking error signal generated during the move of the objective lens in the first direction.

26. The optical disc drive as set forth in claim 25, wherein the discrimination circuit controls the servo processor to close the focus servo loop by driving the objective lens after the loaded optical disc is discriminated to be the first optical disc.

27. An optical disc drive compatible with a plurality of optical discs of different recording densities for at least one of writing and reading data onto or from a loaded optical disc, comprising:

means for moving an objective lens in a first direction substantially normal to a signal plane of an optical disc loaded in the optical disc drive;

means for radiating a laser beam from a light source to the signal plane of the optical disc through the objective lens;

means for detecting a tracking error signal contained in a reflected beam from the signal plane;

means for discriminating between the plurality of optical discs based on a level of a detected tracking error signal; and means for closing a focus servo loop after said means for discriminating discriminates between the plurality of optical discs.

28. The optical disc drive as set forth in claim 27, wherein said moving comprises:

means for moving the objective lens in a second direction radially relative to the optical disk and along said signal plane of said optical disc.

29. The optical disc drive as set forth in claim 28, wherein said means for moving comprises:

means for moving said objective lens in the first direction prior to moving an optical pickup in the second direction.

30. The optical disc drive as set forth in claim 29, wherein the means for discriminating comprises:

means for judging whether the loaded optical disc is a first optical disc or a second optical disc based on a level of a focus error signal generated during a moving of the objective lens in the first direction prior to the moving of the optical pickup in the second direction.

31. The optical disc drive as set forth in claim 29, wherein said means for moving comprises:

means for moving the objective lens in the second direction during a moving of the objective lens in the first direction, wherein said means for judging judges whether the loaded optical disc is a first optical disc or a second optical disc based on a level of tracking error signal generated during a moving of the objective lens in the second direction.

32. The optical disc drive as set forth in claim 29, wherein said means for discriminating comprises:

means for determining whether the loaded optical disc is a first optical disc or a second optical disc based on a level of a tracking error signal generated during a moving of the objective lens in the first direction.

33. The optical disc drive as set forth in claim 32, wherein said means for moving comprises:

means for driving the objective lens in said first direction after said means for determining determines the loaded optical disc to be the first optical disc.

34. An optical disc drive compatible with a plurality of types of optical discs of different recording densities to write and/or read data into and/or from a loaded one of such optical discs, comprising:

an optical pickup provided with a first light source to provide a laser beam of a first wavelength, and a second light source to provide a laser beam of a second wavelength shorter than the first one, and which radiates a laser beam from the first or second light source to an optical disc loaded in the optical disc drive;

a servo processor for controlling focus and tracking servos of the optical pickup based on a focus error signal and a tracking error signal both contained in the reflected beam from the optical disc; and a control circuit for discriminating the type of a loaded optical disc based on a level of the tracking error signal, wherein said control circuit starts pulling in the focus, and then moves the optical pickup radially relative to the disc, and then judges the loaded optical disc as a first one of said plurality of types of optical discs based on a level of the tracking error signal detected during the radial move of the optical pickup, and said servo processor closes a focus servo loop after said control circuit judges the loaded optical disc to be the first one.

35. The optical disc drive as set forth in claim 34, wherein the optical discs include a first optical disc having a first track pitch and a second optical disc having a second track pitch smaller than the first one, and wherein the optical pickup includes an objective lens, wherein the control circuit allows the optical pickup to radiate a laser beam from the first light source to one of the first and second optical discs through the objective lens, and controls the servo processor to move the objective lens in a first direction substantially normal to a signal plane of the optical disc prior to moving the optical pickup radially relative to the disc.

36. The optical disc drive as set forth in claim 35, wherein the control circuit fails to judge a loaded optical disc to be the first or second one based on the level of a focus error signal generated during the move of the objective lens in the first direction prior to moving the optical pickup radially relative to the disc.

37. The optical disc drive as set forth in claim 35, wherein the control circuit further controls the servo processor to move the objective lens in a second direction along the radius of the optical disc during the move of the objective lens in the first direction, and thus judges a loaded optical disc to be the first one or not based on the level of a tracking error signal generated during the move of the objective lens in the second direction.

38. The optical disc drive as set forth in claim 35, wherein the control circuit discriminates a loaded optical disc to be the first one or not, based on the level of a tracking error signal generated during the move of the objective lens in the first direction.

39. The optical disc drive as set forth in claim 38, wherein the control circuit controls the servo processor to close a focus servo loop by driving the objective lens after the loaded optical disc is discriminated to be the first optical disc.

* * * * *